United States Patent [19]
Lambertz

[11] 4,195,947
[45] Apr. 1, 1980

[54] BEARING ARRANGEMENT FOR ROLLER BODIES IN COMPACTING ROLLERS

[76] Inventor: Hans-Reinhard Lambertz, Willbecker Str. 57, 4006 Erkrath 2, Fed. Rep. of Germany

[21] Appl. No.: 883,278

[22] Filed: Mar. 3, 1978

[30] Foreign Application Priority Data

Mar. 9, 1977 [DE] Fed. Rep. of Germany ....... 2710708

[51] Int. Cl.$^2$ ............................................. E01C 19/38
[52] U.S. Cl. ..................................... 404/117; 308/16; 180/65 F; 301/124 H
[58] Field of Search ............... 404/117, 125, 122, 126, 404/123, 127, 124, 128, 129, 130, 131, 132; 301/124 R, 132, 124 H; 308/16, 15; 180/43 B, 65 F; 280/80 R

[56] References Cited
U.S. PATENT DOCUMENTS

| | | | |
|---|---|---|---|
| 2,334,086 | 11/1943 | Greiner | 404/122 X |
| 3,195,429 | 7/1965 | Cowley | 404/117 |
| 3,225,669 | 12/1965 | Green | 404/117 |
| 3,437,019 | 4/1969 | Peterson | 404/117 |
| 3,486,427 | 12/1969 | Waschulewski | 404/117 |
| 3,778,177 | 12/1973 | Haker | 404/117 |
| 3,814,531 | 6/1974 | Carnahan | 404/117 |
| 3,897,843 | 8/1975 | Hapeman | 308/16 X |
| 4,089,616 | 5/1978 | Fairchild | 404/117 |

*Primary Examiner*—Nile C. Byers, Jr.
*Attorney, Agent, or Firm*—Laney, Dougherty, Hessin & Beavers

[57] ABSTRACT

An improved roller bearing structure is provided which is particularly applicable for use in vibratory roller compactors. The roller bearing structure includes a first radially outer bearing ring connected to a non-rotating part, a second radially inner bearing ring connected to a rotating part, and rollers engaging the radially inner and outer surfaces of said first and second bearing rings, respectively. Said first and second bearing rings and the rollers located therebetween comprise a roller bearing ring mount. The radially inner surface of the inner bearing ring is provided with an internal gearing for engagement with a drive pinion to provide a driving input to the rotating part to which the inner bearing ring is secured.

11 Claims, 1 Drawing Figure

BEARING ARRANGEMENT FOR ROLLER BODIES IN COMPACTING ROLLERS

BACKGROUND OF THE INVENTION

1. Field of the Invention

This invention relates generally to improved roller bearing structures and more particularly, but not by way of limitation, to roller bearing ring mounts for use in vibratory roller compactors.

2. Description of the Prior Art

The invention relates to a bearing arrangement for roller bodies in compacting rollers, comprising anti-friction bearings.

Conventionally ball or roller bearings have been used for such bearing arrangements, or tapered-roller bearings, if also axial forces have to be absorbed.

Such conventional bearings are mounted with press fit with the cylindrical peripheral surface of their outer rings within a corresponding bore of one part, and are mounted with the cylindrical inner surface of the inner ring on a correspondingly cylindrical outer surface of the outer part. This presents manufacturing problems.

At first, it is necessary to machine the bore and the outer surface with high accuracy. Thus the diameter of such bearings is limited for this reason alone.

As, with roller bodies of vibration rollers mounted in the vehicle frame in vibration absorbing manner, for example through rubber cushions, tilting torques will act on the bearing arrangement on one side of the roller body and cannot be taken up by one single bearing having a rather small radius, prior art designs (for example U.S. Pat. No. 3,486,427) require two axially spaced bearings (elements 10 and 11 of U.S. Pat. No. 3,456,427) on an axle provided on the vehicle frame. Thereby the space required axially between vehicle frame and the end (roller bottom) (elements 16 of U.S. Pat. No. 3,486,427) of the roller body becomes rather large. Therefore this end wall which supports and reinforces the cylindrical roller body is arranged rather far inwards of the end of the roller body. This impairs the rigidity of the roller body, and this, in turn, is particularly disadvantageous with vibrating rollers.

By inserting the outer ring of the bearing into the bore with press fit, and by placing the inner ring, also with press fit, on the cylindrical outer surface, the play of the bearing is changed in a way hard to control. Also this presents problems in particular with vibrating rollers. Namely if the play becomes too large, there will be the risk of the bearing getting worn. If, however, the play is too small, the bearing may run hot.

Furthermore it is known to mount a disc-shaped part by means of two roller bearings on an axle provided on the vehicle frame and to attach a separate ring with an internal gear to this disc-shaped part, the disc-shaped part being in driving engagement with the roller through rubber cushions (U.S. Pat. No. 3,486,427). This internal gear meshes with a drive pinion which is provided on the shaft of a hydraulic drive motor. Apart from the problems already explained hereinbefore, the axis of rotation in this prior art arrangement is defined by the bearings so that the gear ring has to be aligned accurately concentric to the axis of rotation thus defined.

With another prior art design (German patent specification No. 2,107,793) a hollow axle is affixed to the vehicle frame. A drive pinion is mounted in this hollow axle through two axially spaced ball bearings. The drive pinion is coupled with a hydraulic motor arranged coaxial to the hollow axle. An annular housing is mounted on the hollow axle through two additional ball bearings, this housing being connected to the roller body and having an annular aperture in its inner wall. A stationary gear ring, which is provided on the outside of the hollow axle, extends into this aperture. This gear ring is engaged by a pinion which is mounted in the annular housing by means of a shaft through ball bearings. An intermediate gear is provided on this shaft outside the annular housing and meshes with the drive pinion. The pinion mounted in the housing is driven through the drive pinion and the intermediate gear. Thus the former pinion rolls on the stationary gear ring and causes the housing and the roller body attached thereto to rotate.

This arrangement is a most complex one. All bearing arrangements comprise conventional ball bearings with the problems explained in the beginning.

So-called "ring mounts" are known for mounting machines, such as excavating machines, which are mounted on a chassis for rotation about a vertical axis. Such a ring mount is a roller or journal bearing having an inner ring and an outer ring, with which the outer ring is not located in a bore and the inner ring is not placed on a cylindrical outer surface, but with which both rings are affixed flange-like with their end faces to the chassis and to the rotatable machine unit by means of axial bolts or the like.

SUMMARY OF THE INVENTION

An improved roller bearing structure is provided which is particularly applicable for use in vibratory roller compactors. The roller bearing structure includes a first radially outer bearing ring, a second radially inner bearing ring, and rollers engaging the radially inner and outer surfaces of said first and second bearing rings, respectively. Said first and second bearing rings and the rollers located therebetween comprise a roller bearing ring mount. Said roller bearing ring mount differs from conventional roller bearing structures in that the radially inner and outer bearing races of a conventional bearing structure are attached to an outer cylindrical surface and an inner cylindrical bore, respectively, by press fitting, whereas the radially inner and outer bearing rings of the roller bearing ring mount of the present invention are secured to a rotating and a non-rotating part, respectively, of the structure in which the bearing is used, by means of a plurality of threaded screws or other such connecting means, thereby eliminating the need for precise machining of shafts or bores to accommodate conventional press fit bearings. The rollers provided between the first and second bearing rings of the present invention preferably comprise a crossed roller bearing. This construction allows the radially inner surface of the inner bearing ring to be provided with an internal gearing for engagement with a drive pinion to provide a driving input to the rotating part to which the inner bearing ring is secured.

The roller bearing structure of the present invention is particularly applicable to use in a vibratory compacting roller such as may be used for rolling and compacting earth or asphalt on a road bed. Such a vibratory compacting roller typically includes a pair of spaced roller bearings, generally mounted upon a non-rotating part such as a fixed axle of a vehicle upon which the roller is mounted, and engaging with their outer peripheral surfaces a rotating part, namely the compacting roller which may be referred to as a roller body. Any number of configurations can be used to mount a compacting roller upon a chasis or vehicle, but all such mounting systems can be generalized in that they include a non-rotatable part, e.g., the vehicle chasis, and a rotatable part, e.g., the compacting roller, which are joined together by means of roller bearings which engage said rotatable and non-rotatable parts.

According to the invention at least one of the roller bearings is an anti-friction bearing ring mount, one bearing ring of which is attached to a non-rotatable part by means of attachment elements arranged along the periphery of said one bearing ring, and the other bearing ring of which is attached, by means of attachment elements arranged along the periphery of said other bearing ring to a part rotatable with the roller body.

It has been found that such a bearing arrangement offers considerable advantages for compacting rollers, in particular for vibrating rollers.

The bearings are not inserted with press fit into a bore nor placed on an outer surface, whereby the requirement of accurately machining cylindrical surfaces is eliminated.

The assembly and disassembly, also in the case of repairs, is facilitated, as no pulling out or off of bearing rings is required.

There is no risk of press fits wearing.

As no cylindrical bores in the roller parts for accomodating the bearing need to be machined, the diameter of such bores being limited for manufacturing reasons, the diameter of the ring mount may be made sufficiently large. Thanks to this large diameter of the ring mounts, the accuracy with which the contact surfaces are machined plane needs not to be too high.

The following additional advantages are offered with vibrating rollers:

The inner and outer rings have a well-defined play, which is determined by their dimensions only and cannot be changed by the mounting of the bearing. Therefore the bearing play may be made so small, in controlled manner, that the displacements of the pumps caused by the vibrations can be kept small and undue wear caused thereby is avoided.

With roller bodies held in a vehicle frame in vibration absorbing manner, tilting torques have to be taken up. As the diameter of the ring mount can be made sufficiently large, the ring amount is in the position to absorb the acting tilting torques with rather small forces acting on a long lever arm, contrary to conventional roller bearings. Thus the bearing arrangement may comprise a single rather flat ring mount on each side instead of two axially spaced conventional roller bearings, as in the prior art. Thus relatively little space is required axially at the end of the roller body.

No machine parts for accomodating the inner ring of the ring mount are required within the ring mount. Thus the space within the ring mount is free for the arrangement or passage of drive means, either for the propulsion or for driving a vibration generator.

Preferably the roller bearing of the ring mount is a crossed-roller bearing.

Such a crossed-roller bearing permits axial forces and tilting torques to be taken up, while only rolling friction will occur.

The propulsion may be effected in that one bearing ring of the ring mount has a gearing which is in engagement with a drive pinion.

Thus there will be no problems with regard of the mutual alignment of the bearing and the gear ring.

It is therefore an object of the present invention to provide an improved roller bearing structure.

Another object of the present invention is to provide a roller bearing structure for use in vibratory roller compactors which eliminates the need for the provision of closely machined bores and outer cylindrical surfaces for the mounting of roller bearings therebetween.

Yet another object of the present invention is the provision of a roller bearing ring mount which provides a radially inner gear on the inner surface of an inner bearing ring of the roller bearing mount.

Another object of the present invention is the provision of an economically constructed and maintained roller bearing structure.

And another object of the present invention is the provision of an improved vibratory compacting roller having a roller bearing mount with crossed bearings engaging a roller body and a vehicle upon which the roller body is mounted.

Other and further objects, features and advantages of the present invention will be readily apparent to those skilled in the art upon a reading of the description of preferred embodiments which follows when taken in conjunction with the accompanying drawings.

DETAILED DESCRIPTION OF PREFERRED EMBODIMENTS OF THE INVENTION

Figure 1:
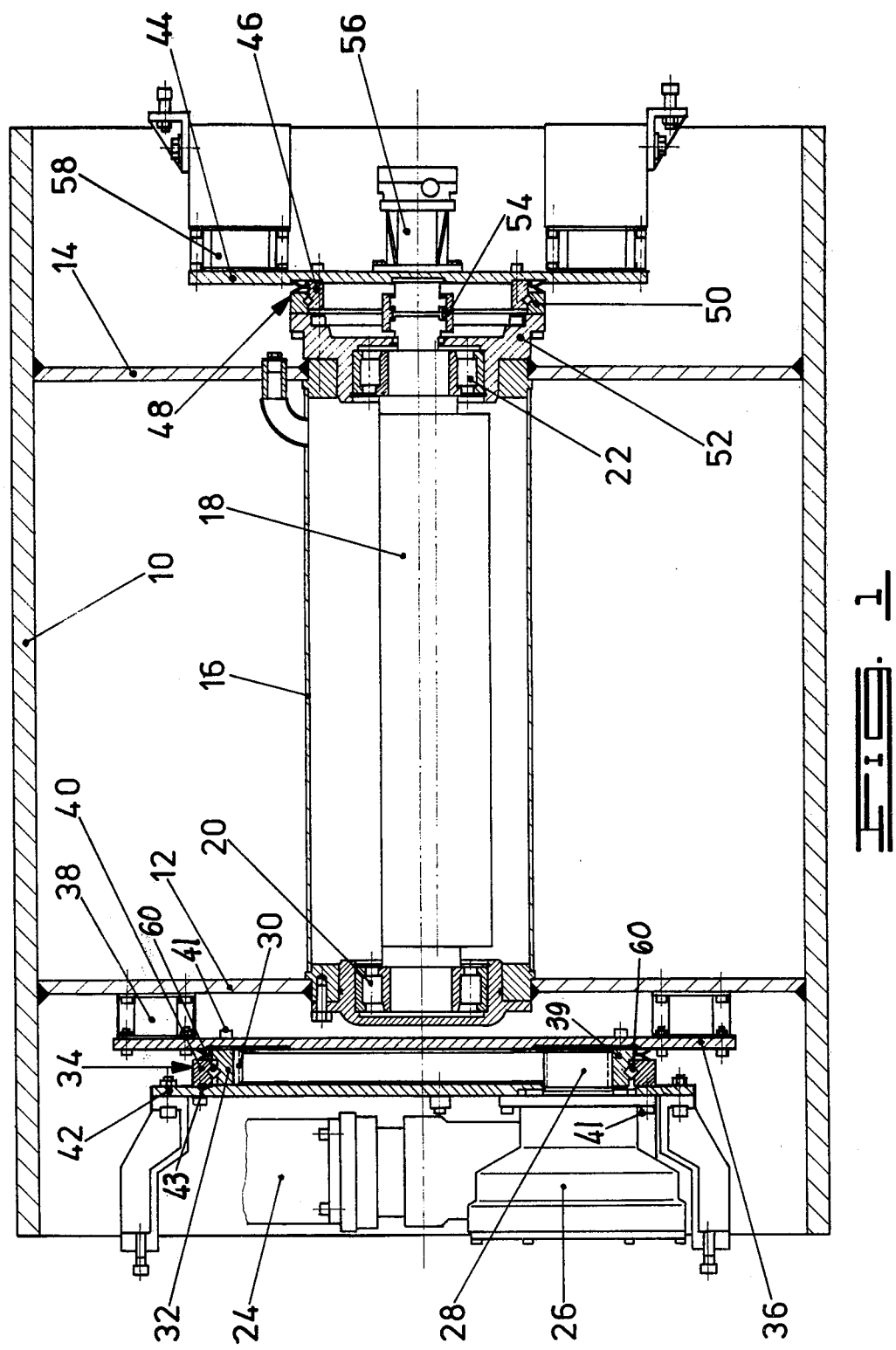
FIG. 1 is an elevational, partly sectional view of a vibratory roller compactor including the improved roller bearing structure of the present invention.

An embodiment of the invention will now be described with reference to the accompanying drawing, which is a longitudinal sectional view of a roller body having a bearing arrangement of the invention.

Numeral 10 designates the cylinder of the roller body. Roller bottoms or end walls 12 and 14 are provided on the cylinder 10. The housing 16 of an unbalance vibrator extends between the roller bottoms. An unbalance vibrator 18 is mounted in the roller bottoms through roller bearings 20 and 22. The propulsion drive of the roller body is effected by a hydrostatic motor 24 trough a miter gear 26 and a drive pinion 28. This drive pinion 28 engages an internal gearing 30 of the inner ring 32 of the ring mount 34. This inner ring 32 is screwed flange-like to a cushion spider 36, which, in turn, is attached to the roller bottom 12 through rubber cushions 38. That is, an axially inner end face or periphery 39 of the inner ring 32 is connected to the cushion spider 36, which may also be described as a vertical radially extending plate of the roller body, by means of a plurality of axial attachment elements or screws 41. The outer ring 40 of the ring mount 34 is screwed flange like to first contact plate 42 affixed to the vehicle frame. That is, an axially outer end face or periphery 43 of the outer ring 40 is connected to the first contact plate 42, which may also be referred to as a radially extending plate of the vehicle frame, by a plurality of attachment elements or screws 41. Inner ring and outer ring of the ring mount are mounted on each other through a crossroller bearing.

The inner ring 46 of a second ring mount 48 is screwed to a second contact plate 44, which is also attached to the vehicle frame. The outer ring 50 of the ring mount 48 is screwed flange-like to an intermediate member 52, which is attached to the roller bottom 14. The inner ring 46 and the outer ring 50 of the ring mount 48 are also mounted on each other through a crossed-roller bearing.

A coupling 54 is arranged within the ring mount 48. A hydrostatic motor 56 mounted on the contact plate 44 drives the unbalance vibrator 18 through this coupling. The contact plate 44, in turn, is connected to the vehicle frame through rubber cushions 58. A crossed-roller bearing is a roller bearing, in which the axes of the rollers or roller elements 60 form an angle, for example of 45°, with the axis of the bearing, the axes of the rollers being inlined alternatingly towards one or the other side with respect to the axis of the bearing. The bearing rings have correspondingly conical rolling surfaces for the two sets of rollers.

The improved roller bearing construction of the present invention is particularly suited for use with a vibratory compacting roller apparatus of the type having a rotatable part such as the cylinder 10, a non-rotatable part such as the vehicle frame which includes the contact plates 42 and 44, and an anti-friction bearing mounted therebetween such as the bearing ring mount 34 or 48.

Thus, the improved roller bearing structure of the present invention is well adapted to carry out the objects and attain the ends and advantages mentioned as well as those inherent therein. While presently preferred embodiments of the invention have been described for the purpose of this disclosure, numerous changes in the construction and arrangement of parts can be made by those skilled in the art, which changes are encompassed within the spirit of this invention as defined by the appended claims.

I claim:

1. A vibratory compacting roller comprising:
   a vehicle frame;
   a vertical contact plate connected to said frame;
   a roller body, for rotation about a horizontal axis, and having a vertically extending end wall;
   a cushion spider, spaced from said end wall;
   rubber cushion means connecting said end wall and said cushion spider;
   a first bearing ring having an axial end face engaging said contact plate;
   a second bearing ring having an axial end face engaging said end wall; and
   roller elements engaging said first and second bearing rings, whereby said first and second bearing rings and said roller elements form a roller bearing ring mount.

2. The apparatus of claim 1 further comprising:
   a motor, connected to said frame;
   a drive pinion driven by said motor; and
   an internal gear on said second bearing ring, engaging said drive pinion.

3. The apparatus of claim 2 wherein said roller elements comprise a crossed-roller bearing.

4. In a roller body, for compacting roller apparatus of the type having a rotatable part, a non-rotatable part and an anti-friction bearing mounted between said rotatable and non-rotatable parts, the improvement wherein said anti-friction bearing includes a bearing ring mount comprising:
   a first bearing ring, attached to said non-rotatable part by means of attachment elements arranged along a periphery of said first bearing ring; and
   a second bearing ring located radially inward of said first bearing ring and attached to said rotatable part by means of attachment elements arranged along a periphery of said second bearing ring, said second bearing ring including an internal gearing for engagement with a drive pinion.

5. The apparatus of claim 4 wherein:
   said first bearing ring is further characterized as having an axially outer end face attached by axial attachment means to a contact plate affixed to said non-rotatable part; and
   said second bearing ring is further characterized as having an axially inner end face, remote from said contact plate, attached to a radial surface of said rotatable part.

6. Apparatus of claim 4 wherein said bearing ring mount is further characterized as being a crossed-roller bearing.

7. Apparatus of claim 4, wherein said drive pinion is further characterized as being fixed relative to said non-rotating part.

8. A roller bearing ring mount for rotatingly connecting a roller body to a vehicle frame, comprising:
   a first bearing ring having an axially outer end face;
   first means for attaching said axially outer end face to said vehicle frame;
   a second bearing ring located radially inward of said first bearing ring and having an axially inner end face, said second bearing ring including an internal gear for engagement with a driving pinion;
   second means for attaching said axially inner end face to said roller body; and
   rollers, engaging said first and second bearing rings.

9. Apparatus of claim 8, wherein said driving pinion is further characterized as being fixed relative to said vehicle frame.

10. The ring mount of claim 8 wherein said rollers are further characterized as crossed-rollers.

11. The ring mount of claim 8 wherein:
    said first attaching means comprises a plurality of attachment elements for connecting said outer end face to a first radially extending plate of said vehicle frame; and
    said second attaching means comprises a plurality of attachment elements for connecting said inner end face to a second radially extending plate of said roller body.

* * * * *